United States Patent Office 3,773,758
Patented Nov. 20, 1973

3,773,758
7α-CYANO - 17 - HYDROXY-3-OXO-17α-PREGN-4-ENE-21-CARBOXYLIC ACID γ-LACTONE AND RELATED COMPOUNDS
Richard M. Weier, Deerfield, Ill., assignor to G. D. Searle & Co., Chicago, Ill.
No Drawing. Filed Dec. 1, 1972, Ser. No. 311,157
Int. Cl. C07c 173/00
U.S. Cl. 260—239.57    6 Claims

ABSTRACT OF THE DISCLOSURE

7α - cyano - 17 - hydroxy - 3 - oxo - 17α-pregn-4-ene-21-carboxylic acid γ-lactone and related 7α-cyano steroids are described. They possess diuretic activity of the aldosterone-antagonist type. The 7α-cyano-3-keto-$\Delta^4$ lactones are prepared by reacting the corresponding 3-keto-$\Delta^{4,6}$ steroids with potassium cyanide and can function as starting materials for the remaining compounds.

---

The present invention relates to 7α-cyano steroidal spirolactones, to opened-chain carboxylic acids and salts derived therefrom, and to certain enol esters of those compounds. More particularly, this invention provides novel compounds of the general structural formulae

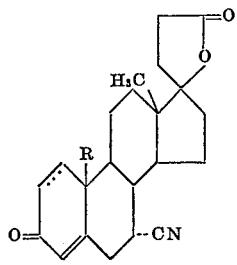

(Ia)

and

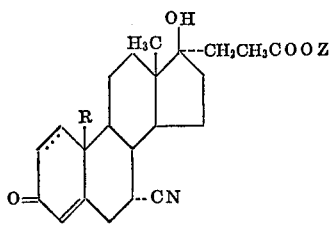

(Ib)

and

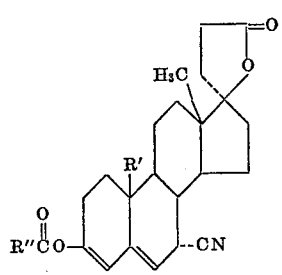

(Ic)

wherein the dotted line indicates the optional presence of a $\Delta^1$ unsaturated linkage; R is a methyl radical and, when the 1,2-linkage is saturated, R can also be hydrogen; Z is hydrogen, alkali metal, alkaline-earth metal/2 or ammonium; R' is hydrogen or a methyl radical; and R" is an alkyl radical containing 1 to 3 carbon atoms.

The alkyl radicals encompassed by the R" term are methyl, ethyl, propyl and isopropyl. Preferred alkali metals and alkaline-earth metals encompassed by the Z term include potassium, sodium, lithium, magnesium and calcium. Those skilled in the art will recognize that the term "alkaline-earth metal/2" is dictated by the fact that alkaline-earth metals are divalent, whereas the other groups represented by Z are monovalent; and when, for example, Z represents Ca/2 in Formula Ib, the contemplated salts are more conventionally depicted thus

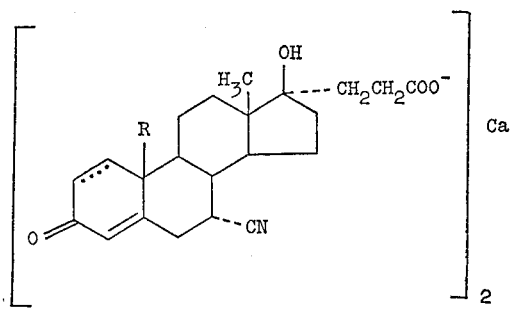

The foregoing compounds are useful by reason of their valuable biological properties. Thus, for example, they are diuretic: They reverse the effect of desoxycorticosterone acetate (DCA) on urinary sodium and potassium.

The capacity of the instant compounds to reverse the renal electrolyte effects of DCA is evident from the results of a standardized test for this property carried out in rats substantially as described by C. M. Kagawa in Chapter 34 of volume II of "Evaluation of Drug Activities: Pharmacometrics," by D. R. Laurence and A. L. Bacharach. Details of such testing are described in U.S. Pat. No. 3,422,096. Representative compounds of the invention found active in this test are 7α-cyano-17-hydroxy-3-oxo-17α-pregn-4-ene-21-carboxylic acid γ-lactone, 3-acetoxy-7α-cyano - 17 - hydroxy-17α-pregna-3,5-diene-21-carboxylic acid γ-lactone, and potassium 7α-cyano-17-hydroxy-3-oxo-17α-pregn-4-ene-21-carboxylate.

Those skilled in the art will recognize that observations of activity in standardized tests for particular biological effects are fundamental to the development of valuable new drug products, both veterinary and human.

The compounds of Formula Ia wherein the 1,2-linkage is saturated can be prepared by contacting the corresponding compound of the formula

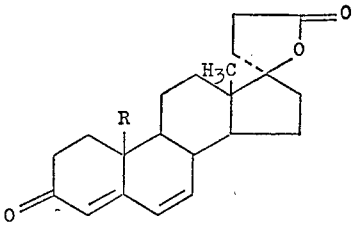

wherein R is hydrogen or methyl, with an alkali metal cyanide, preferably potassium or sodium cyanide, or with diethylaluminum cyanide. When an alkali metal cyanide is employed, the reaction mixture is conveniently heated in a suitable solvent system, e.g. acetic acid-water-dimethylsulfoxide or water-ethanol. If diethyl-aluminum cyanide is used, the reaction is conducted at room temperature in an inert atmosphere.

Dehydrogenation of the compound of Formula Ia wherein R is methyl and the 1,2-linkage is saturated affords the corresponding compound of Formula Ia wherein the 1,2-linkage is unsaturated. The dehydrogenation is effected by use of a reagent conventional for the conversion of a 3-keto-$\Delta^4$ steroid to a 3-keto-$\Delta^{1,4}$ steroid. A preferred reagent is 2,3-dichloro-5,6-dicyano-1,4-benzoquinone, which is conveniently heated with the $\Delta^4$ starting material in a suitable solvent such as benzene, xylene or dioxane. Another reagent suitable for this purpose is selenium dioxide, which is generally heated with the Δ⁴ starting material in t-butanol.

Reaction of a compound of Formula Ia with one equivalent of an alkali metal hydroxide affords the corresponding alkali metal salt of Formula Ib. This reaction is conveniently conducted in an aqueous medium, preferably in an aqueous alkanol, e.g. methanol. If desired, the resultant salt of Formula Ib can be exposed to a proton source for a short period of time, thus affording the corresponding acid of Formula Ib. Thus, subsequent brief contact of an alkali metal salt of Formula Ib with a mineral acid, e.g. hydrochloric acid, under very dilute conditions, affords the corresponding 21-carboxylic acid.

Contacting a compound of Formula Ib wherein Z is hydrogen with one equivalent of a suitable base, e.g. an alkali metal or alkaline-earth metal hydroxide, preferably in an aqueous alkanol, will afford the desired alkali metal of alkaline-earth metal/2 salt.

The ammonium salts of Formula Ib can be prepared from the corresponding 21-carboxylic acids by treatment with excess ammonia, suitably in an organic solvent such as 2-propanol.

The compounds of Formula Ic can be prepared by heating the corresponding compounds of Formula Ia wherein the 1,2-linkage is saturated with the appropriate acid halide and acid anhydride of the formulae

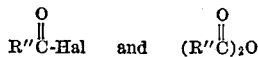

wherein R″ is an alkyl radical of 1 to 3 carbon atoms and Hal is a halogen atom, preferably a chlorine atom.

A highly desirable alternate route to the compounds of Formula Ic wherein R″ is a methyl radical involves contacting the corresponding compounds of Formula Ia wherein the 1,2-linkage is saturated with isopropenyl acetate and a small quantity of p-toluenesulfonic acid.

An alternative route to the compound of Formula Ia wherein the 1,2-linkage is unsaturated employs a 2α- or 2β-bromo-7α-cyano-17-hydroxy-3-oxo-17α-pregn-4-ene-21-carboxylic acid γ-lactone, or a mixture of those isomers, as a starting material. That material is subjected to dehydrobromination, under conditions conventional for that purpose, to afford the desired Δ¹,⁴ compound. Heating the 2-bromo starting material with calcium carbonate in a solvent such as dimethylformamide or dimethylacetamide has been found to be especially convenient.

The 2-bromo compounds utilized as starting materials in the process discussed in the preceding paragraph can be readily prepared by reacting 3-acetoxy-7-cyano-17-hydroxy-17α-pregna-3,5-diene-21-carboxylic acid γ-lactone with N-bromosuccinimide.

The invention will appear more fully from the examples which follow. These examples are given by way of illustration only and are not to be construed as limiting the invention either in spirit or in scope, as many modifications both in materials and methods will be apparent to those skilled in the art. In these examples, temperatures are given in degrees centigrade (° C.) and quantities of materials are expressed in parts by weight unless parts by volume are specified. The relationship between parts by weight and parts by volume is the same as that existing between grams and milliliters.

EXAMPLE 1

To a solution of 2.62 parts of glacial acetic acid and 19.99 parts of 17 - hydroxy-3-oxo-17α-pregna-4,6-diene-21-carboxylic acid γ-lactone in 200 parts by volume of 2% aqueous dimethyl sulfoxide is added 4.28 parts of potassium cyanide. The resultant slurry is allowed to stand at room temperature for approximately 16 hours, then is heated on a steam bath for 2 hours. The reaction mixture is then allowed to stand for 24 hours at room temperature after which time it is poured onto ice chips. The precipitate which forms is filtered, washed twice with water by decantation, dried and then recrystallized from methanol. There is thus obtained 7α-cyano-17-hydroxy-3-oxo-17α-pregn-4-ene-21-carboxylic acid γ-lactone, melting at about 228–230° C. and being further characterized by the structural formula

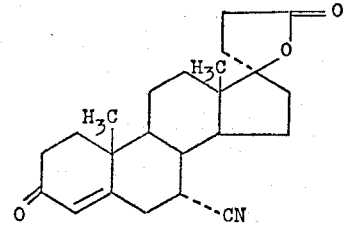

EXAMPLE 2

To a solution of 0.79 part of glacial acetic acid and 3.91 parts of 17 - hydroxy-3-oxo-19-nor-17α-pregna-4,6-diene-21-carboxylic acid γ-lactone in 30 parts by volume of 2% aqueous dimethyl sulfoxide is added 0.84 part of potassium cyanide. The resultant slurry is heated on a steam bath, with occasional stirring, for 6 hours. The reaction mixture is thereafter allowed to stand at room temperature for approximately 16 hours, then is heated on a steam bath for 1 hour and poured hot onto ice chips. The resultant crude brown solid is washed by decantation with a small amount of cold methanol, purified by treatment with decolorizing charcoal in boiling methanol, and then recrystallized from cold methanol. The product, 7α-cyano-17-hydroxy-3-oxo-19 - nor-17α-pregn-4-ene-21-carboxylic acid γ-lactone, melts at about 239–244° C.

EXAMPLE 3

A slurry of 0.37 part of 7α-cyano-17-hydroxy-3-oxo-17α-pregn-4-ene-21 - carboxylic acid γ-lactone and 0.08 part of p-toluenesulfonic acid in 5.0 parts by volume of isopropenyl acetate is stirred under reduced pressure for 6 days. During that period, the reaction mixture is twice evaporated to dryness, a fresh 5.0 part by volume quantity of isopropenyl acetate being added to the residue after each evaporation. At the end of the 6 day period, the reaction mixture is poured into approximately 50 parts by volume of a 1:1 by volume mixture of benzene and 5% aqueous potassium bicarbonate solution. The organic layer is separated and the aqueous layer is extracted with benzene. The organic layers are combined and extracted, first with a 5% aqueous potassium bicarbonate solution, then with water. The organic layer thus obtained is dried over sodium sulfate and magnesium sulfate and then stripped of solvent to afford a yellow oil which is crystallized from methanol to give 3-acetoxy-7α-cyano-17-hydroxy-17α - pregna-3,5-diene-21-carboxylic acid γ-lactone. That compound is a white crystalline material melting at about 212–215° C. and having the structural formula

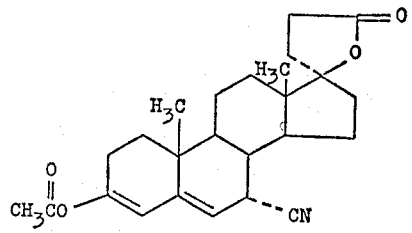

EXAMPLE 4

A solution of 1.49 parts of 7α-cyano-17-hydroxy-3-oxo-17α-pregn-4-ene - 21 - carboxylic acid γ-lactone and 0.91 part of 2,3-dichloro-5,6-dicyano-1,4-benzoquinone in 72.1 parts of dioxane is refluxed for 7 hours. The reaction mixture is then stripped in vacuo and the brown residue is heated with 134 parts of dichloromethane. The insoluble brown solid is removed by filtration and the filtrate is washed three times with 2% aqueous sodium sulfite solution, then twice with saturated aqueous sodium chloride solution. The organic layer is dried over sodium sulfate and magnesium sulfate. The yellow oil thus obtained is crystallized and recrystallized from methanol to yield 7α-cyano-17-hydroxy-3-oxo-17α-pregna-1,4 - diene-21-carboxylic acid γ-lactone, melting at about 259–262° C.

EXAMPLE 5

A solution of 1.27 parts of 3-acetoxy-7α-cyano-17-hydroxy-17α-pregna-3,5-diene-21-carboxylic acid γ-lactone and 0.60 part of N-bromosuccinimide in 22.35 parts of chloroform containing a trace of benzoyl peroxide is refluxed with stirring for 2 hours. The reaction mixture is then stripped in vacuo and the resultant yellow foam is treated with methanol. The white solid thus obtained is identified by thin layer chromatography to be a mixture of 2α- and 2β - bromo-7α-cyano-17-hydroxy-3-oxo-17α-pregn-4-ene-21-carboxylic acid γ-lactone. Gradient elution chromatography of that mixture on silica affords pure 2α-bromo-7α-cyano-17-hydroxy - 3 - oxo-17α-pregn-4-ene-21-carboxylic acid γ-lactone which, after recrystallization from a mixture of methylene chloride and ethyl ether, melts at about 214–215° C. with decomposition.

EXAMPLE 6

A mixture of 0.30 part of sodium acetate, 0.41 part of 3 - acetoxy-7α-cyano-17-hydroxy-17α-pregna-3,5-diene-21-carboxylic acid γ-lactone and 0.20 part of N-bromosuccinimide in a solution of 15 parts by volume of 30% aqueous acetone and 1.05 parts of glacial acetic acid is stirred at 0° C. for approximately 90 minutes. The reaction mixture is thereupon diluted with water and filtered. Recrystallization of the residual solid from a mixture of methylene chloride and ethyl ether affords 2β-bromo-7α-cyano - 17 - hydroxy-3-oxo-17α-pregn-4-ene-21-carboxylic acid γ-lactone, melting at about 234–235° C. with decomposition.

EXAMPLE 7

A solution of 0.48 part of a mixture of 2α- and 2β-bromo-7α-cyano-17-hydroxy - 3 - oxo-17α-pregn-4-ene-21-carboxylic acid γ-lactone in 19 parts of N,N-dimethylformamide is combined with 0.80 part of calcium carbonate and heated at the reflux temperature with stirring for 2 hours. The reaction mixture is cooled and poured onto chipped ice. The brown precipitate which forms is filtered, dried in air, and recrystallized twice from methanol. The product, 7α-cyano - 17 - hydroxy-3-oxo-17α-pregna-1,4-diene-21-carboxylic acid γ-lactone, melts at about 259–262° C.

EXAMPLE 8

A mixture of 0.73 part of 7α-cyano-17-hydroxy-3-oxo-17α-pregn-4-ene-21-carboxylic acid γ-lactone, 2.7 parts by volume of 0.73 N aqueous potassium hydroxide solution and 31.6 parts of methanol is warmed gently to effect solution. The mixture is allowed to stand for approximately 16 hours at room temperature, then is heated at 40–50° C. for 40 minutes and stripped of solvent under reduced pressure. The yellow gummy residue is further dried azeotropically by distillation with ethanol. Trituration of the residue with ethyl ether affords potassium 7α-cyano-17-hydroxy-3-oxo-17α-pregn-4-ene-21-carboxylate (monohydrate) as a yellow powder. That product is characterized by the structural formula

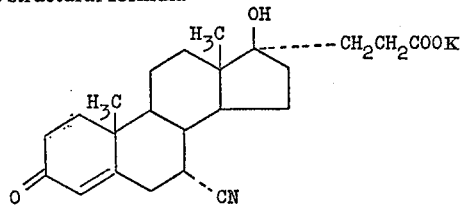

EXAMPLE 9

To a solution of 1.0 part of potassium 7α-cyano-17-hydroxy-3-oxo-17α-pregn-4-ene-21-carboxylate in 70 parts of water is added 20 parts of 5% hydrochloric acid. The resultant precipitate is filtered off, washed with water and dried in air. The material thus isolated is 7α-cyano-17-hydroxy-3-oxo-17α-pregn-4-ene-21-carboxylic acid.

EXAMPLE 10

A mixture of 200 parts of 7α-cyano-17-hydroxy-3-oxo-17α-pregn-4-ene-21-carboxylic acid, 19 parts of calcium hydroxide and 4000 parts of 20% aqueous methanol is stirred at 40° C. under nitrogen for 2 hours. Solvent is then removed by vacuum distillation and the residue is recrystallized from ethyl acetate. The product thus isolated is calcium bis[7α-cyano - 17 - hydroxy-3-oxo-17α-pregn-4-ene-21-carboxylate].

EXAMPLE 11

To 20 parts of 2-propanol, saturated with ammonia, is added 1 part of 7α-cyano-17-hydroxy-3-oxo-17α-pregn-4-ene-21-carboxylic acid. The resulting mixture is allowed to stand at room temperature for 24 hours, at which point solvent is removed by vacuum distillation. The residue is washed with ethyl acetate and dried in air, affording ammonium 7α-cyano-17-hydroxy-3-oxo-17α-pregn-4-ene-21-carboxylate.

EXAMPLE 12

Substitution of an equivalent quantity of 7α-cyano-17-hydroxy-3-oxo-19-nor-17α-pregn-4-ene - 21 - carboxylic acid γ-lactone for the 7α - cyano-17-hydroxy-3-oxo-17α-pregn-4-ene-21-carboxylic acid γ-lactone called for in Example 3 affords, by the procedure there detailed, 3-acetoxy-7α-cyano-17-hydroxy-19-nor - 17α-pregna-3,5-diene-21- carboxylic acid γ-lactone.

EXAMPLE 13

A solution of 5.0 parts of 7α-cyano-17-hydroxy-3-oxo-17α-pregn-4-ene-21-carboxylic acid γ-lactone in 15.4 parts of butyryl chloride and 14.9 parts of butyric anhydride is heated on a steam bath for 2 hours. The reaction mixture is thereafter stripped in vacuo and the solid material thus obtained is recrystallized from a mixture of methanol and benzene to afford 3-butyryloxy-7α - cyano - 17 - hydroxy-17α-pregna-3,5-diene-21-carboxylic acid γ-lactone.

What is claimed is:
1. A compound selected from the group consisting of steroids of the general formulae

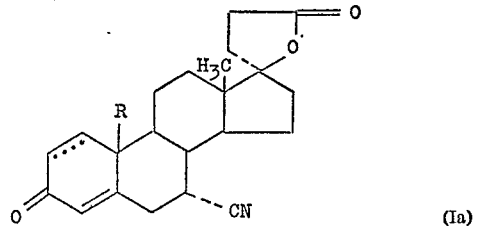

(Ia)

and

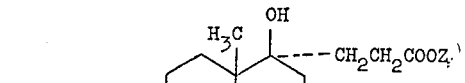

(Ib)

and

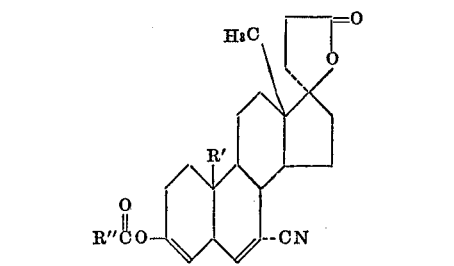

(Ic)

wherein the dotted line indicates the optional presence of a Δ¹ unsaturated linkage; R is a methyl radical and, when the 1,2-linkage is saturated, R can also be hydrogen; Z is hydrogen, alkali metal, alkaline-earth metal/2 or ammonium; R' is hydrogen or a methyl radical; and R" is an alkyl radical containing 1 to 3 carbon atoms.

2. A compound according to claim 1 which is 7α-cyano-17-hydroxy-3-oxo-17α-pregn-4-ene-21 - carboxylic acid γ-lactone.

3. A compound according to claim 1 which is 7α-cyano-17-hydroxy-3-oxo-19-nor-17α-pregn - 4 - ene - 21 - carboxylic acid γ-lactone.

4. A compound according to claim 1 which is 7α-cyano-17-hydroxy-3-oxo - 17α - pregna - 1,4 - diene - 21 - carboxylic acid γ-lactone.

5. A compound according to claim 1 which is potassium 7α-cyano-17-hydroxy-3-oxo-17α-pregn-4 - ene - 21 - carboxylate.

6. A compound according to claim 1 which is 3-acetoxy-7α-cyano-17-hydroxy-17α - pregna - 3,5 - diene - 21-carboxylic acid γ-lactone.

References Cited
UNITED STATES PATENTS

| | | | |
|---|---|---|---|
| 3,509,136 | 4/1970 | Brown | 260—239.57 |
| 3,715,349 | 2/1973 | Sollman | 260—239.57 |

HENRY A. FRENCH, Primary Examiner

U.S. Cl. X.R.

260—397.1